United States Patent
Cherubini et al.

(10) Patent No.: US 7,876,521 B2
(45) Date of Patent: Jan. 25, 2011

(54) SERVO CONTROL IN TAPE DRIVES

(75) Inventors: Giovanni Cherubini, Zurich (CH); Jens Jelitto, Zurich (CH); Mark Alfred Lantz, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/487,252

(22) Filed: Jun. 18, 2009

(65) Prior Publication Data

US 2009/0316296 A1 Dec. 24, 2009

(30) Foreign Application Priority Data

Jun. 18, 2008 (EP) ................... 08104461

(51) Int. Cl.
  *G11B 17/00* (2006.01)
  *G11B 5/584* (2006.01)
  *G11B 20/20* (2006.01)

(52) U.S. Cl. ............... 360/71; 360/76; 360/77.12; 242/334.6

(58) Field of Classification Search ............ None
See application file for complete search history.

(56) References Cited

U.S. PATENT DOCUMENTS

| | | | |
|---|---|---|---|
| 2,938,962 A | 5/1960 | Konins et al. | |
| 4,062,047 A | 12/1977 | Scull | |
| 6,222,698 B1* | 4/2001 | Barndt et al. | 360/76 |
| 6,430,008 B1 | 8/2002 | Trabert et al. | |
| 6,563,659 B1 | 5/2003 | Fasen | |
| 6,724,559 B1 | 4/2004 | Konishi et al. | |
| 6,934,108 B2 | 8/2005 | Harper et al. | |
| 7,142,389 B2* | 11/2006 | Nakao | 360/77.12 |
| 7,436,621 B2* | 10/2008 | Goker et al. | 360/76 |
| 2002/0163752 A1* | 11/2002 | Peterson | 360/76 |
| 2004/0141250 A1* | 7/2004 | Harper et al. | 360/71 |
| 2007/0070545 A1* | 3/2007 | Koski et al. | 360/134 |

FOREIGN PATENT DOCUMENTS

| | | | |
|---|---|---|---|
| GB | 2362984 A | | 12/2001 |
| WO | WO 01/75874 A2 | | 10/2001 |

* cited by examiner

*Primary Examiner*—Andrew L Sniezek
(74) *Attorney, Agent, or Firm*—Vazken Alexanian

(57) ABSTRACT

Servo control methods and apparatus for a tape drive. A read/write head reads and writes data on magnetic tape with at least one servo track providing transverse position information. At least two servo readers arranged for reading a servo track associated with the read/write head operate concurrently to generate servo read signals. A position estimator processes each servo read signal to generate a series of position values corresponding to respective time instants indicative of their transverse positions. A servo controller calculates a skew value indicative of tape skew relative to the read/write head and a tension variation value indicative of variation of tape tension. The servo controller is adapted to account for cross-coupling between tape skew and tension variation.

20 Claims, 4 Drawing Sheets

US 7,876,521 B2

SERVO CONTROL IN TAPE DRIVES

CROSS REFERENCE TO RELATED APPLICATION

This application claims priority under 35 U.S.C. 119 from European Patent Application Number 08104461.2, filed Jun. 18, 2008, the entire contents of which are incorporated herein by reference.

BACKGROUND OF THE INVENTION

1. Field of the Invention

The present invention relates generally to servo control in tape drives. In particular, the present invention provides control methods and apparatus for use with magnetic tape having one or more servo tracks providing transverse position information during read/write operations.

2. Description of Related Art

In recent years, the capacity and performance of tape storage systems has increased considerably, and the potential for further growth appears to be substantial. In order to achieve higher cartridge capacities and improved performance, advances in several technical areas are necessary. Areal density increase, i.e. increase in linear and/or track density, is key to achieving higher storage capacities. In the former case, the distance between adjacent bit cells decreases, leading to an increase in interference between characters. Higher track density implies narrower track width, narrower read/write heads and closer head spacing, leading to losses in signal-to-noise ratio. Also, issues of intertrack-interference become critical.

Reliable servomechanisms for controlling the tape transport and tape/head positioning systems, such as reel-to-reel and track-following servomechanisms, are therefore important for achieving best overall drive performance.

Tape storage systems typically use dedicated servo tracks recorded alongside the data tracks on the tape to provide positional information for use by the servo control system. In linear tape open (LTO) tape drive systems for example, the timing-based servo (TBS) format has been adopted as a standard. The TBS system defines a format for the servo pattern recorded in the servo tracks and is detailed in Standard ECMA-319, "Data interchange on 12.7 mm 384-track magnetic tape cartridges—Ultrium-1 format," June 2001, pp. 48 to 56. The TBS servo pattern, described in more detail below, has a frame format wherein magnetic transitions define a series of stripes with two different azimuthal slopes. During read/write operations, the transverse position of the read/write head can be derived from the relative timing of pulses generated by a narrow servo reader head reading the stripe pattern. TBS patterns also allow the encoding of additional longitudinal position information without affecting the generation of the transverse position error signal (PES). This is obtained by shifting transitions (stripes) in the servo pattern from their nominal pattern position in the longitudinal direction of the tape.

In accordance with the LTO standard, servo tracks are recorded in servo bands which extend on either side of each of several data bands spaced transversely across the tape. Different servo readers can be arranged for reading servo tracks in different bands concurrently during read/write operations, thus providing more information to the servo control system. For example, in current IBM tape systems there are four servo readers arranged on two modules of the read/write head as illustrated in FIG. 1 of the accompanying drawings. Each of the left and right head modules shown schematically here has two servo readers S, one above and one below a line of alternating read and write elements, labeled R and W respectively, only partially shown in the figure.

The two servo readers S on each module are thus arranged for reading respective servo tracks on either side of the current data band. This modular head arrangement allows reading and writing in both directions of tape travel, with writing always being performed by the leading module. As alternate tracks are written by the write elements W of the leading module, the two servo readers of that module are active, and the read elements of the trailing module are used to verify the written data.

For a read operation in a given direction of tape travel, the two servo readers of the module with active read elements are operative. Thus, two servo readers on one of the two modules are active at all times during read/write operations. A transverse position-error signal (PES) can be derived from the servo read signal from each of the two active readers S. In particular, an estimate of the transverse position of a given reader S (relative to a desired or nominal position, typically the servo track centre line) can be derived from the servo read signal for each frame of the TBS servo pattern. Reading of successive servo frames by reader S results in a series of transverse position estimates for time instants corresponding to reading of respective servo frames. The resulting position-error signal is used together with tape speed and LPOS information derived from the servo pattern for track-following and reel-to-reel servo control functions.

Among the main problems adversely affecting the performance of track following and reel-to-reel servomechanisms, as well as the quality of readback signals in data channels, are the dynamic skew and the variation of tape tension. Dynamic skew arises when the head does not remain perfectly perpendicular relative to the direction in which the tape moves. Tape skewing with respect to the head during tape motion tends to produce increasing loss of signal as frequency rises as well as readback-signal frequency fluctuations. These cannot easily be tracked by the phase-lock loops that are usually implemented in detection systems. Moreover, tape skewing introduces delays in the data channels that have to be estimated and compensated for. When operating in the steady state velocity mode, variations of tape tension around the nominal value, also called once-arounds, are induced by the reel eccentricities. In tape transport, this problem is particularly serious when the reel rotation frequencies are near the resonance frequency determined by the tape path. Tape tension errors affect the position error signal and hence the performance of track following servo.

The adverse effects of dynamic skew and tension variation are well known and understood, and various approaches have been proposed to estimate these quantities to improve drive operation. For example, U.S. Pat. No. 6,563,659 discloses a system for estimating changes in tape tension based on detected changes in distance between two transversely spaced servo bands. The changes in distance are determined from position-error signals derived for two servo read elements reading respective servo bands.

A system described in U.S. Pat. No. 6,934,108 measures changes in tension based on changes in longitudinal tape length, particularly changes in longitudinal distance between two known points in the servo pattern read by a servo read head. Tape reel motor torque is then adjusted accordingly.

U.S. Pat. No. 4,062,047 describes test equipment for separately measuring read head skew and write head skew in a tape recording system. Read head skew is determined by reading a reference tape, and write head skew is determined by reading a pattern written by the write head using a properly-aligned read head. In both cases, the skew estimates are based on time differences between corresponding peaks of identical timing signals recorded in two transversely spaced tracks read by respective read heads.

U.S. Pat. No. 6,430,008 senses tape skew based on timing differences between signals from two transversely-spaced servo read elements reading respective servo tracks, with tape head positioning being controlled accordingly.

U.S. Pat. No. 6,724,559 discloses a similar system in which the detected skew is corrected either by rotating the tape head or by tilting rollers in the tape path. While these techniques make some manner of provision for one or other of tape skew and tension variation, an improved system would be highly desirable for the reasons discussed earlier.

SUMMARY OF THE INVENTION

One embodiment of the present invention provides servo apparatus for a tape drive having a read/write head for reading and writing data on magnetic tape with at least one servo track for providing transverse position information. The apparatus includes: at least two servo readers associated with the read/write head, each arranged for reading the servo track during read/write operations, the servo readers being operative concurrently to generate respective servo read signals; a position estimator for processing each servo read signal to generate a series of position values, corresponding to respective time instants, indicative of transverse position of the associated servo reader; and a servo controller for calculating from the position values and time instants (i) a skew value, indicative of tape skew relative to the read/write head, and (ii) a tension variation value indicative of variation of tape tension from a reference value. The servo controller is adapted to account for cross-coupling between tape skew and tension variation in calculating the skew and tension variation values.

A second embodiment of the present invention provides a tape drive including: a read/write head for reading and writing data on magnetic tape having at least one servo track for providing transverse position information; a drive system for effecting movement of the tape relative to the read/write head; and servo apparatus according to the first embodiment of the present invention.

A third embodiment of the present invention provides a servo control method for a tape drive having a read/write head for reading and writing data on magnetic tape with at least one servo track for providing transverse position information. The method includes the steps of: reading at least one servo track during read/write operations concurrently with at least two servo readers associated with the read/write head to generate respective servo read signals; processing each servo read signal to generate a series of position values, corresponding to respective time instants, indicative of transverse position of the associated servo reader; and calculating from the position values and time instants (i) a skew value, indicative of tape skew relative to the read/write head, and (ii) a tension variation value indicative of variation of tape tension from a reference value. The calculation accounts for cross-coupling between tape skew and tension variation.

BRIEF DESCRIPTION OF THE DRAWINGS

Preferred embodiments of the present invention are described below, with reference to the accompanying drawings in which.

DETAILED DESCRIPTION OF PREFERRED EMBODIMENTS

Servo control apparatus embodying the present invention uses values indicative of transverse position of each of two or more servo readers, and timings associated with these position values, to estimate both tape skew and tension variation jointly during read/write operations. In the preferred embodiments, not only are values for both quantities calculated in operation, the calculation also takes account of cross-coupling between tape skew and tension variation, i.e. the effect of one quantity on the other. This offers exceptional efficiency in servo control functions, allowing corrections for both tape skew and tension variations to be made at the same time, and to a high degree of accuracy, during normal read/write operations. By using the transverse position values and associated timings, this joint estimation of skew and tension variation can be performed based on read signals from any two servo readers operating concurrently, whether reading the same or different servo tracks. Embodiments of the present invention thus enable implementation of highly efficient servo control systems, based on joint estimation of tape skew and tension variation, without requiring addition of costly tension and position sensors.

Figure 1:
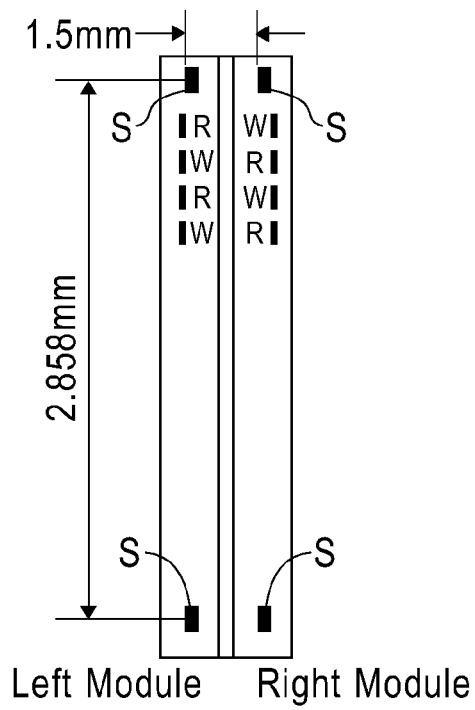
FIG. 1 illustrates a modular read/write head used in existing tape drives.

The servo readers are most conveniently mounted on the read/write head, as exemplified in the FIG. 1 construction, so as to read the servo tracks during read/write operations. In the example of FIG. 1, the joint estimation process could be based on read signals from any pair of servo readers S operated concurrently.

The position estimator may be adapted to process TBS servo read signals. In this case, the series of position values for each servo reader can be the transverse position estimates derived from successive frames of the TBS servo pattern as described above. Each position estimate then corresponds to a time instant at which the respective servo frame is read by the servo reader. In general, of course, other servo patterns might be employed for providing transverse position information. The position values may thus depend in a variety of ways on transverse position of the servo reader, each position value being associated with a particular time instant for which that value is deemed generated, such that the position value is in some manner indicative of transverse position of the servo reader at that time instant.

While alternatives can be envisioned, the servo controller may calculate the skew and tension variation values from each set of position measurements, one for each servo reader, and their corresponding time instants. These values may be fed back via control signals in closed loop servo systems to effect appropriate dynamic adjustments in the drive system. In particular, the servo may include a tension adjustment mechanism for adjusting tape tension in dependence on the tension variation value, and a skew adjustment mechanism for adjusting tape skew relative to the read/write head in dependence on the skew value. In some embodiments, the servo controller may generate the skew and tension variation values by processing values produced from several successive sets of position measurements, e.g. by averaging or filtering for smoothing purposes, the processed values then being used in the servo control operations. Embodiments can also be envisioned where the position values and time instants (in particular differences between time instants) are processed in some way, e.g. averaged or smoothed over several measurements, and the processed values used by the servo controller to calculate the skew and tension variation values.

Preferred embodiments include at least three servo readers arranged for reading at least two servo tracks and operative concurrently to generate respective servo read signals. In a particularly convenient arrangement, the three servo readers include a pair arranged for reading a first servo track and a third arranged for reading a different servo track spaced transversely across the tape from the first servo track. In these embodiments, the three servo readers could be used in two pairs to produce two sets of skew and tension variation values which could then be averaged for greater accuracy. However, as an additional feature in preferred embodiments, where three servo readers operate concurrently the servo controller can be adapted to account for time dependency of tape skew and tension variation in calculating the skew and tension variation values, and may calculate respective time derivatives of the skew and tension variation values. The time derivative values can also be fed back in control signals for refining the dynamic adjustment of tape tension and skew. These embodiments offer an exceptional combination of accuracy and efficiency in servo control systems.

Figure 2:
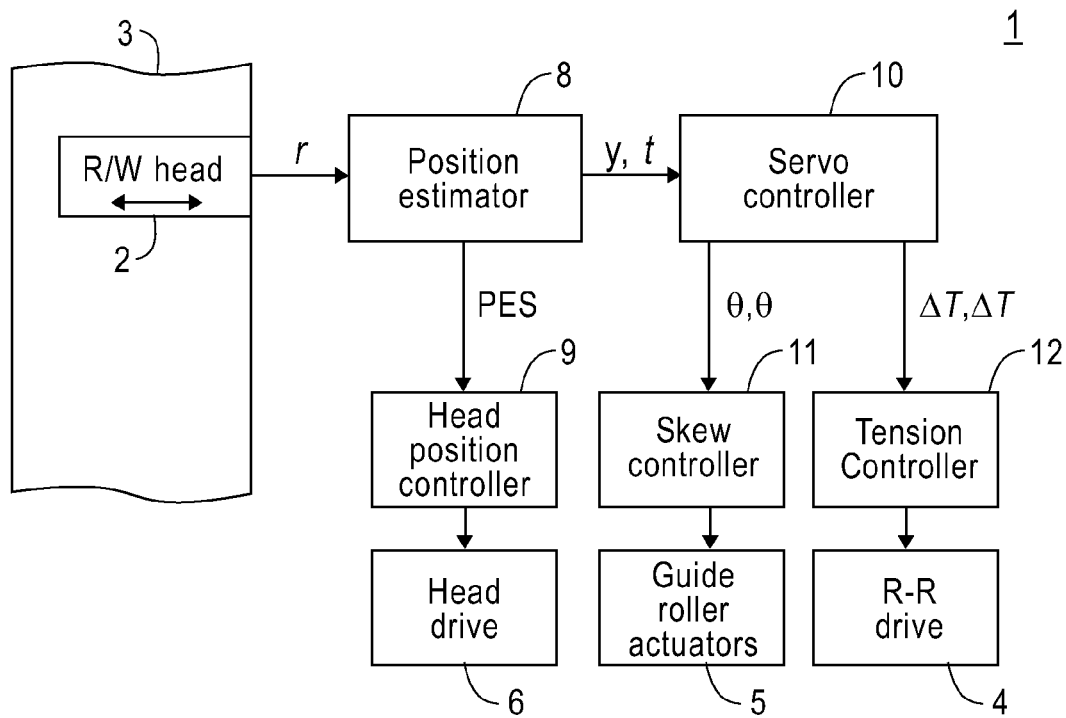
FIG. 2 is a schematic illustration of a tape drive embodying the present invention.

FIG. 2 is a simplified schematic of a tape drive 1 illustrating the main elements involved in implementing servo control functions embodying the present invention. The tape drive 1 has a read/write head 2 for reading and writing data on magnetic tape 3. A drive system effects relative movement of the tape 3 and head 2 during read/write operations, conveying the tape past the head and controlling positioning of the head transversely across the width of the tape. Specifically, a reel-to-reel (R-R) drive mechanism 4 includes motors for driving the tape reels (not shown), allowing the tape to be transported in either direction between a supply reel and a take-up reel. During this process, guide rollers (not shown) in the tape path control movement of the tape past the head. In this embodiment, these rollers can be tilted by operation of actuators 5, providing active tape guidance to counter tape skew as discussed below. A head drive mechanism 6 effects transverse movement of the read/write head 2 for initial alignment and track following during read/write operations.

The read/write head 2 of drive 1 is substantially identical to that described above with reference to FIG. 1, having four servo readers S arranged on two modules with alternating read/write elements as shown in that figure. In contrast to the earlier system, all four servo readers S are active concurrently in this embodiment of the present invention. During read/write operations, each servo reader S outputs a servo read signal r to a position estimator 8, only one signal r being indicated in the FIG. 2 for simplicity. Position estimator 8 processes three of the four servo read signals r in a generally known manner to produce a position error signal (PES) for the corresponding servo reader S. This process is described in more detail below. In this embodiment, the fourth servo read signal is effectively a spare signal, being used in the event of failure of one of the other three servo readers. In the present example, position estimator 8 averages the three position error signals to produce an average PES signal which is fed back to a head position controller 9. This supplies an appropriate control signal to head drive 6 so that the head 2 is moved transversely to correct for positional errors.

In position estimator 8, the succession of transverse position estimates y (derived in producing the position error signal for each servo reader S) and the time instants t to which these estimates correspond as discussed further below, are output to a servo controller 10. The servo controller processes the y, t values for the three servo readers S to calculate a skew value $\theta$, a time derivative $\theta'$ of the skew value, a tension variation value $\Delta T$, and a time derivative $\Delta T'$ of the tension variation value. The skew value $\theta$ constitutes an estimate of the skew angle of tape 3 relative to read/write head 2.

Figure 3:
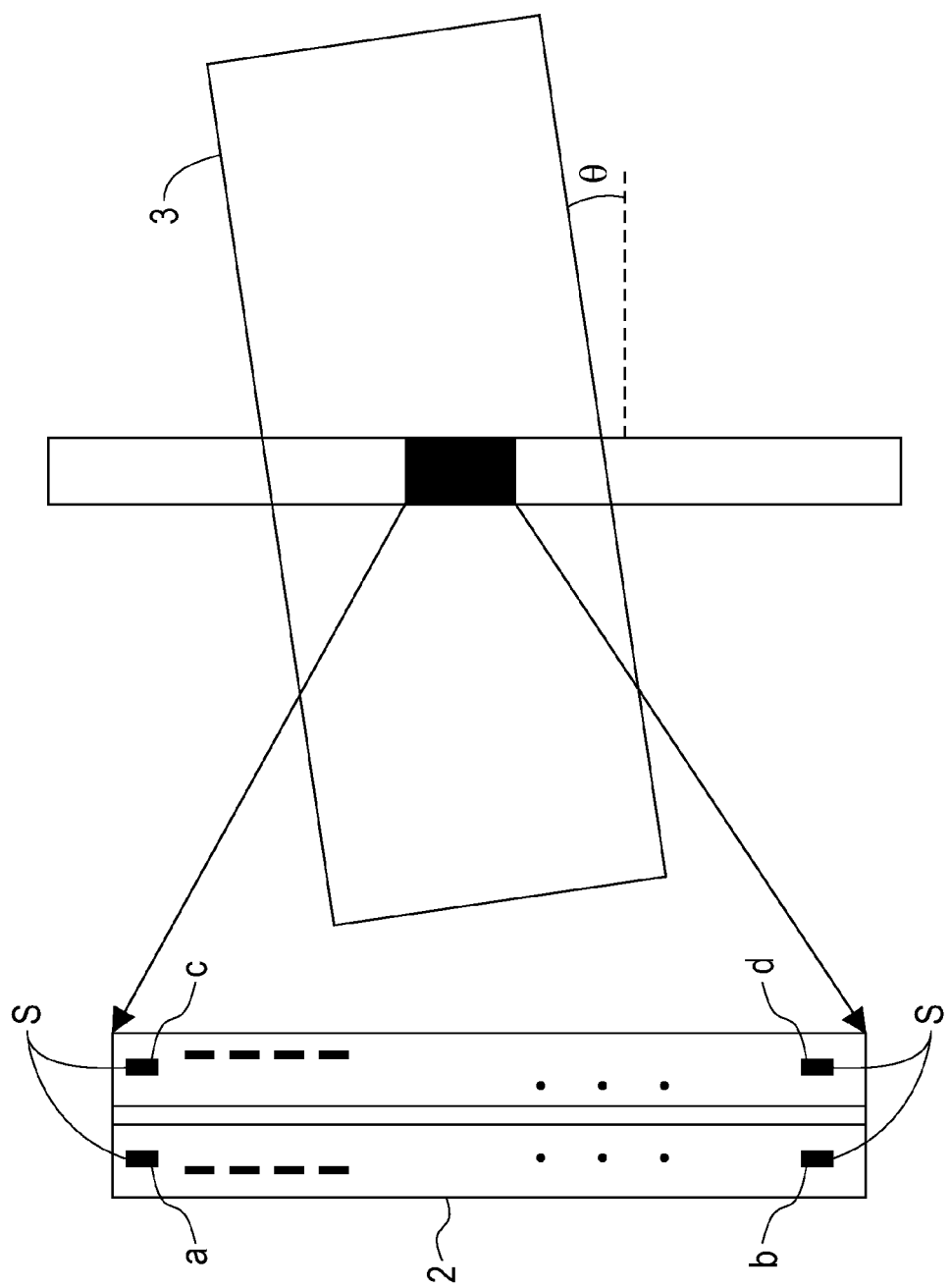
FIG. 3 is an enlarged view of the read/write head, illustrating the effect of tape skew, in the FIG. 2 drive.

This is illustrated in the enlarged view of FIG. 3 which shows the skew angle $\theta$ defined in accordance with convention here as the azimuth angle between the normal to the head and the direction of tape motion. The tension variation value $\Delta T$ is an estimate of the deviation of the tape tension acting along the length of the tape from a reference value, here a predetermined desired or nominal value. The time derivatives $\theta'$ and $\Delta T'$ represent estimates of the rate of change of skew angle and tension variation respectively. The joint calculation of these values by servo controller 10 is described in more detail below.

The values of $\theta$ and $\theta'$ calculated from successive sets of y, t values are supplied by servo controller 10 to a skew adjustment mechanism. This includes a skew controller 11 controlling guide roller actuators 5. Skew controller 11 supplies control signals based on the received values of $\theta$ and $\theta'$ to actuators 5 so as to tilt the guide rollers in the tape path to counter tape skew. Similarly, the values of $\Delta T$ and $\Delta T'$ calculated from successive sets of y, t values are supplied by servo controller 10 to a tension adjustment mechanism. This includes a tension controller 12 controlling reel-to-reel drive 4.

Tension controller 12 supplies control signals based on the received values of $\Delta T$ and $\Delta T'$ to the reel motors to adjust the motor torque to counter tension variations. In practice, the reel-to-reel drive 4 typically also operates under servo control dependent on tape velocity and LPOS information derived from the servo pattern as mentioned earlier, though these control operations are independent of the tension control servo and need not be discussed further here. Servo controller 10, skew controller 11 and tension controller 12 are conveniently implemented by digital circuitry, though in general these components could be implemented in hardware or software or a combination thereof, and suitable implementations will be apparent to those skilled in the art from the description herein.

During read/write operation of head 2, the upper and lower pairs of servo readers S read respective servo tracks on either side of the current data band on tape 3. In this example we assume that drive 1 is LTO-compliant and position estimator 8 is adapted to process TBS servo read signals.

Figure 4:
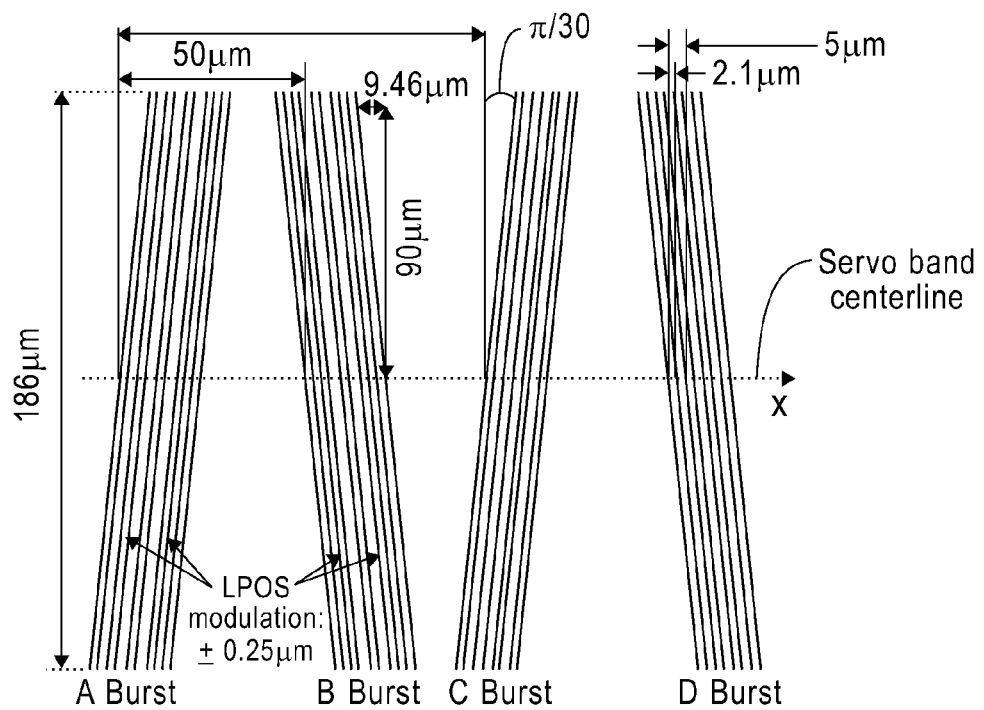
FIG. 4 illustrates the TBS frame format for LTO servo patterns.

The TBS servo pattern frame format is illustrated in FIG. 4. Each servo frame corresponds to one 200-μm period of the LTO servo pattern and consists of four servo bursts labeled A, B, C and D. The A and B bursts have 5 servo stripes whereas the C and D bursts have 4 stripes. The servo stripes consist of two transitions in magnetization that are 2.1 μm apart and are written at an azimuth angle of ±π/30 radians (6 degrees). The servo stripes within a servo burst are spaced at a distance of 5 μm from each other.

The difference in azimuth angles of the servo bursts means that the relative times at which a servo reader reads the first stripe of the A and B bursts depend on the transverse (y) position of the reader relative to the servo band centerline shown in the figure. In particular, the time difference between reading of the corresponding stripes of the A and B bursts changes with distance from the centerline. In contrast, the time difference between reading corresponding stripes of the A and C bursts is independent of y-position. Hence, a ratio of the A-B time difference to the A-C time difference provides a direct indication of transverse position of the servo reader relative to its desired position at the centerline. This ratio is independent of tape velocity $v_T$. The A-C time difference, however, is velocity-dependent and can be used to estimate the tape velocity $v_T$.

Figure 5:
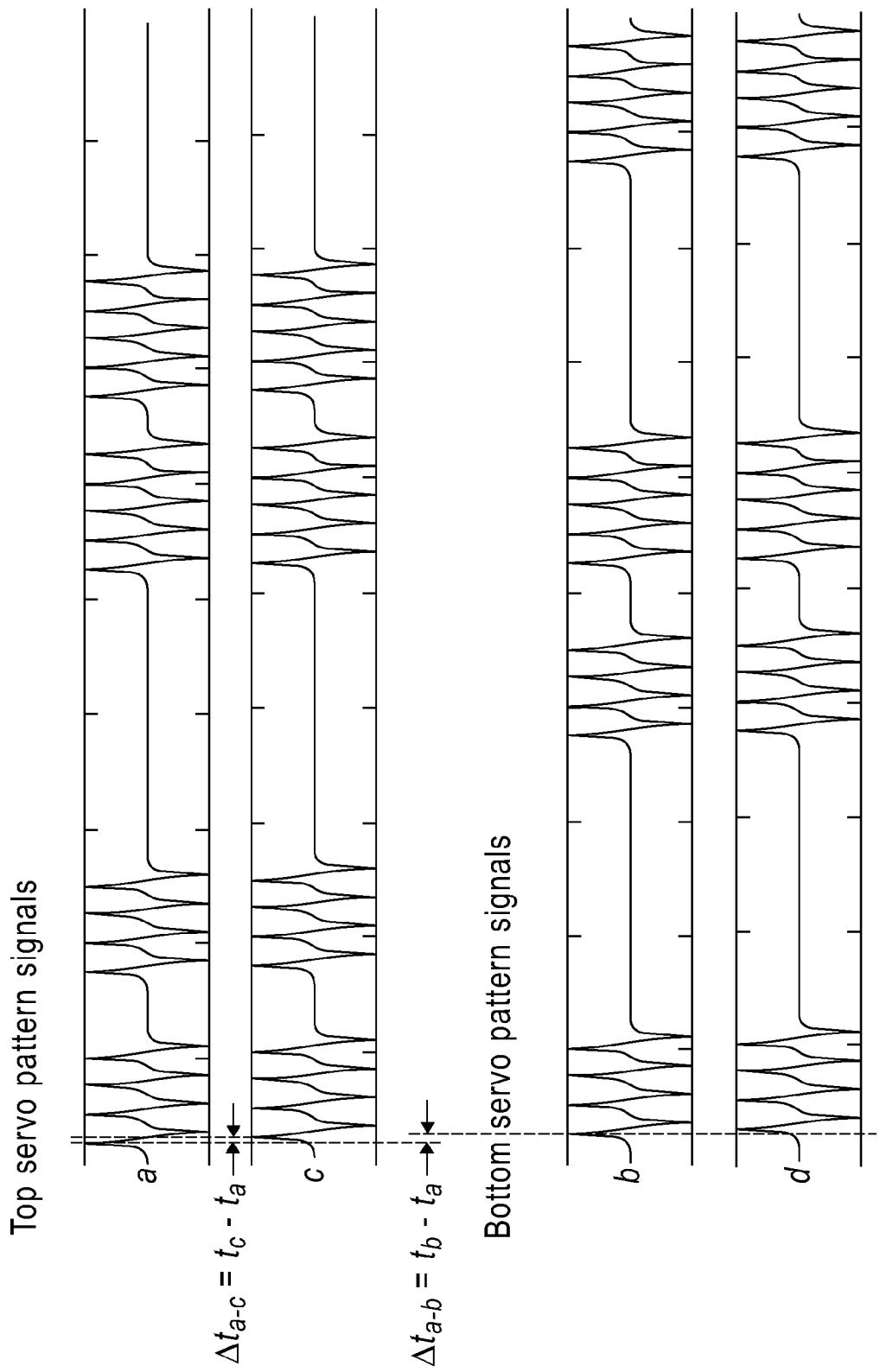
FIG. 5 shows exemplary timing differences between signals from four servo readers on the read/write head.

Thus, as each servo reader S traverses frames of the servo pattern, a series of estimates y of the transverse position of that reader is generated as the position error signal PES for that reader. Each position value y in the series corresponds to a time instant t at which the corresponding frame of the servo pattern is read. For the four servo readers S on head 2, the relative timings at which these read servo frames depends on the geometry of the head, the servo frame length, and any offset between servo patterns in the two servo tracks, as well as the effects of tape skew and tension variations. The read signals from the four servo readers, labeled a, b, c and d in FIG. 3, may thus be offset in time as illustrated schematically in FIG. 5. The illustrated time offsets $\Delta t_{a-c}$ and $\Delta t_{a-b}$, together with the y-position estimates for the servo readers, form the basis of the calculations performed by servo controller 10 as is explained with reference to FIG. 6.

Figure 6:
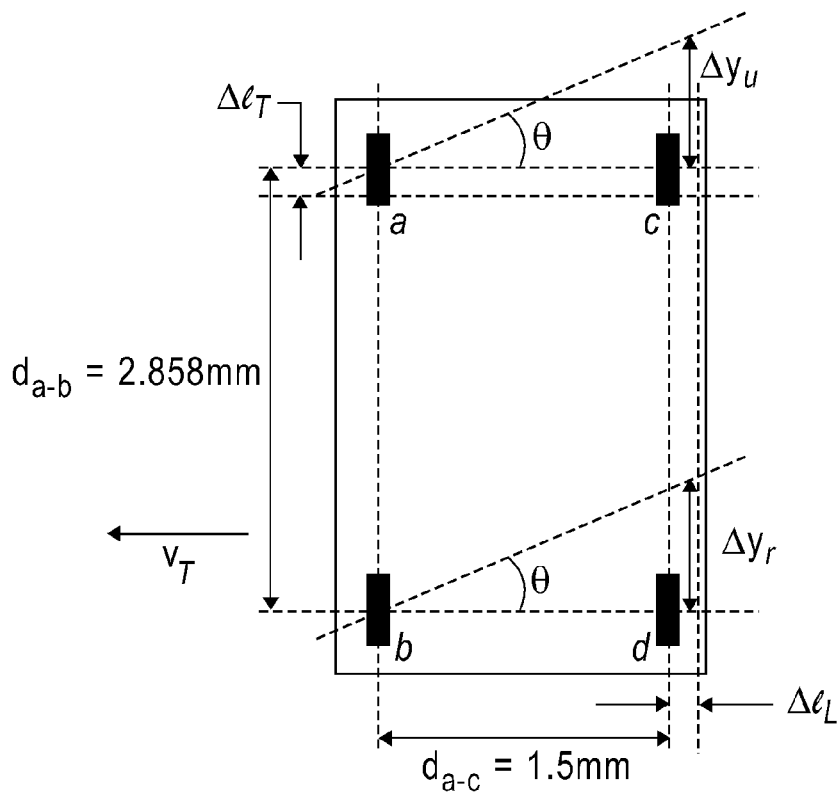
FIG. 6 is a diagram of the read/write head geometry indicating effects of tape skew and tension variation on position and timing measurements.

FIG. 6 shows an abstraction of the geometry of head 2 indicating the effects of skew and tension variation on various measurements. In this figure:

θ is the variation of azimuth angle due to tape skew;

$\Delta l_L$ is the change of tape length in the longitudinal direction due to tension variation $\Delta T$;

$\Delta l_T$ is the change of tape length in the transverse direction due to tension variation $\Delta T$;

$\Delta y_u$ is the difference in position measured by servo reader c relative to the transverse position measured by servo reader a;

$\Delta y_l$ is the difference in position measured by servo reader d relative to the transverse position measured by servo reader b; and $v_T$ is the tape velocity.

With reference to this diagram, the equations of tape transport mechanics give:

$$\Delta l_L \approx \frac{\Delta T / k_T}{l_p} d_{a-c} \tag{1}$$

where $\Delta T$ is the deviation of the applied tension from the nominal value, $k_T$ is the tape spring constant, and $l_p$ is the tape-path length. Assuming elastic behavior of the tape, for a length of tape equal to the width w, and tape thickness u, in the longitudinal direction the change in length for a variation of the applied tension is given by $$\Delta l_w \approx \frac{w \Delta T}{wuE}$$

where E denotes the Young's modulus of the tape. Therefore the tape spring constant can be expressed as $$k_T = \frac{wuE}{l_p} \tag{2}$$

Consequently, for a length of tape equal to the distance $d_{a-c}$ between two servo readers having the same transverse position on different modules of the head, $$\Delta l_L \approx \frac{\Delta T}{uE} \frac{d_{a-c}}{w} \tag{3}$$

Observing (3) and recalling Hooke's law, the change in tape length in the transverse direction due to the deviation of the applied tension from the nominal value, and evaluated relative to one of the four data bands on a tape with the current LTO format, is expressed as $$\Delta l_T \approx -v \frac{\Delta T}{4uE} \tag{4}$$

where v denotes the Poisson's ratio of the tape.

Recalling the head geometry and the servo format definition, introducing $d_{nom} = \mathrm{mod}(d_{a-c}, 200\ \mu m)$, and $t_{nom} = d_{rel}/v_T$, where $d_{rel}$ is the relative displacement in the longitudinal direction between servo patterns in adjacent servo bands, it is possible to establish the timing relationships of servo channel signals. In particular, four equations for the joint estimates of the skew value θ, the tension variation $\Delta T$, and their respective time derivatives θ' and $\Delta T'$ can be derived as follows.

1. Considering the pair of servo readers a and b (or alternatively reader pair c and d), the azimuth θ can be expressed as $$\theta = \arctan\left(\frac{\Delta x}{d_{a-b}}\right) \approx \frac{\Delta x}{d_{a-b}} \tag{5}$$

where the function arctan(x) is approximated by its argument (x), assuming small values of x. Assuming without loss of generality that in the absence of skew and tension variation the servo channels a and b are expected to produce estimates of the lateral servo reader position (y-estimates) at the time instants $t_b$ and $t_a$, respectively, with $t_b - t_a = t_{nom}$, the segment $\Delta x$ corresponds to the distance that the tape travels in the time interval $t_b - t_a - t_{nom}$, given by $$\Delta x_1 \approx v_T(t_b - t_a - t_{nom}) \tag{6}$$

corrected by the variation of tape length due to the variation of tension. Recalling (3), and observing that the variation of the tension $\Delta T$ in the considered interval is $\Delta T'(t_b - t_a)$, the correction term is given by $$\Delta x_2 \approx \frac{d_{a-c}}{w} \frac{\Delta T + \Delta T'(t_b - t_a)}{uE} \tag{7}$$

By substituting $\Delta x = \Delta x_1 - \Delta x_2$ into (5), and observing that the variation of azimuth in the considered interval is $\theta'(t_b - t_a)$, one gets $$\theta \approx \frac{v_T}{d_{a-b}}\left[(t_b-t_a)\left(1-\frac{d_{a-c}}{w}\frac{\Delta T'}{uEv_T}\right)-t_{nom}-\frac{d_{a-c}}{w}\frac{\Delta T}{uEv_T}\right]-\theta'(t_b-t_a) \quad (8)$$

2. Considering the pair of servo readers a and c (or alternatively reader pair b and d), the azimuth θ can also be expressed as $$\theta = \arctan\left(\frac{\Delta y_u}{d_{a-c}}\right) \approx \frac{\Delta y_u}{d_{a-c}} \quad (9)$$

Denoting by $y_c(t_c)$ and $y_a(t_a)$ the y-estimates produced at the time instants $t_c$ and $t_a$, respectively, and observing $$\Delta y_u \approx y_c(t_c) - y_a(t_a) \quad (10)$$

one gets $$\theta \approx \frac{y_c(t_c) - y_a(t_a)}{d_{a-c}} - \theta'(t_c - t_a) \quad (11)$$

3. Consider now the pair of servo readers a and c (or alternatively reader pair b and d). Assuming without loss of generality that in the absence of skew and tension variation the servo channels a and c are expected to produce y-estimates at the time instants $t_c$ and $t_a$, respectively, with $t_c-t_a=d_{nom}/v_T$, the change in tape length for a variation of the applied tension corresponds to the distance that the tape travels in the time interval $t_c-t_a-d_{nom}/v_T$, given by $$\Delta l_1 \approx v_T(t_c-t_a)-d_{nom} \quad (12)$$

corrected by the variation of traveled distance due to the azimuth error, that is approximated as $$\Delta l_2 \approx d_{a-c}(\theta+(t_c-t_a)\theta') \quad (13)$$

Observing (1) and (3), the change in tape length for a variation of the applied tension can be expressed as $$\Delta l_L = \Delta l_1 - \Delta l_2 \approx d_{a-c}\left(\frac{\Delta T}{k_T l_p} + \frac{\Delta T'(t_c-t_a)}{wuE}\right) \quad (14)$$

By recalling the expression of the tape-path spring constant (2), substituting (12) and (13) into (14), and rearranging terms, one gets $$\Delta T \approx \frac{wuE}{d_{a-c}}[v_T(t_c-t_a)-d_{nom}-d_{a-c}\theta-d_{a-c}(t_c-t_a)\theta']-\Delta T'(t_c-t_a) \quad (15)$$

4. Consider now the pair of servo readers a and b (or alternatively pair c and d). The change in tape length in the transverse direction, which is due to the deviation of the applied tension from the nominal value and is evaluated relative to one of the four data bands on a tape with the current LTO format, can be expressed as the difference in the y-estimates that are produced by the servo channels a and b at the time instants $t_a$ and $t_b$, respectively, given by $$\Delta l_3 \approx y_a(t_a)-y_b(t_b) \quad (16)$$

corrected by the variation in distance in the transverse direction between adjacent servo bands that is due to skew, that is approximated as $$\Delta l_4 \approx d_{a-b}(\theta+(t_b-t_a)\theta') \quad (17)$$

Observing (4), the change in tape length in the transverse direction for a variation of the applied tension can thus be expressed as $$\Delta l_T = \Delta l_3 - \Delta l_4 \approx -v\frac{\Delta T + \Delta T'(t_b-t_a)}{4uE} \quad (18)$$

By substituting (12) and (13) into (14) and rearranging terms, one gets $$\Delta T \approx \frac{4uE}{v}[y_b(t_b)-y_a(t_a)+d_{a-b}\theta+d_{a-b}(t_b-t_a)\theta']+\Delta T'(t_b-t_a) \quad (19)$$

It will be seen that each of derivations 1 to 4 in the foregoing analysis provides a formula for skew or tension variation which accounts for both cross-coupling between these quantities, i.e. the effect of one on the other, and time dependency of the quantities, the latter having an effect on measurements due to the timing offsets between read signals from different servo readers. Note that in derivation 2 the effect of tension variation on the position estimates $y_c(t_c)$ and $y_a(t_a)$ effectively cancels out since the difference between these values is used in the formula for θ. The four equations (8), (11), (15), (19) resulting from this analysis can be solved for the four variables θ, θ', ΔT, and ΔT'.

In this embodiment, the solutions to these equations are used by servo controller 10 to calculate values for θ, θ', ΔT, and ΔT' for each set of three y, t value-pairs output by position estimator 8 for the three servo readers for which these values are derived. The resulting values are output to controllers 11 and 12 for effecting adjustments to the tape transport system to compensate for skew and tension variations as described above. In particular, to compensate for dynamic skew, the skew controller 11 generates control signals for the guide roller actuators 5 to tilt the rollers in the tape path to correct for the angle of skew. This can be done in generally known manner as will be apparent to those skilled in the art. The estimated derivative θ' is preferably used in a state-space based realization of the control system, as the derivative θ' can be expressed as a linear combination of the state variables describing the dynamics of the physical plant being controlled.

By way of example, a state-space based control system for controlling tilting rollers is described in "Control of Lateral Motion in Moving Webs", Yerashunas et al., IEEE Transactions on Control Systems Technology, Vol. 11, No. 5, September 2003. Similarly, to compensate for tension variation from a nominal value, the tension controller 12 generates control signals for the motors of the reel-to-reel system to adjust the motor torque and hence the tape tension. Again this can be done in generally known manner, one particular example being discussed in "Controller Development for a Prototype High-Speed Low-Tension Tape Transport", Mathur et al., IEEE Transactions on Control Systems Technology, Vol. 6, No. 4, July 1998.

As in the case of dynamic skew compensation, the estimated derivative ΔT' is preferably used in a state-space based realization of the reel-to-reel control system. In determining the reel-to-reel drive control signals, the tension controller 12 could adjust for the fact that changes in the distance between the servo bands can also result from creep effects or due to the swelling or shrinking of the tape as it absorbs or expels water as the ambient humidity changes. These effects, however, occur on a much longer time scale than the typical "once-around" tension variations discussed above, and therefore only interfere with the estimation of the steady state tension and not estimation of dynamic tension variations, i.e., the AC component of the tension. The control signal supplied to drive mechanism 4 could therefore be based on an absolute tension value obtained using the known or estimated motor torque constants and reel radii to generate the desired nominal tape tension (as is currently done for tension control), with the estimated dynamic tension variation used to generate an AC correction term. This correction term would have a maximum amplitude that is limited to the range of typical maximum tension excursion due to once around reel eccentricities, corresponding to about ±20% of the nominal tension.

It will be seen that the foregoing provides a highly efficient servo control system for tape drive 1 using joint estimation of dynamic skew and tension variation, and accounting for cross-coupling and time-dependent effects, based on concurrent operation of three servo readers S during read/write operations. The signal from the fourth servo reader provides enough redundancy to enable the generation of the estimates even in the case of failure of one of the servo readers. Therefore, the embodiment described above provides a simple, robust and highly accurate servo control system.

While one preferred embodiment has been described above, various alternatives and modifications can be envisioned. For example, different adjustment mechanisms for correcting for skew or tension variation can be employed in other embodiments. To counter skew effects, instead of adjusting tape positioning via roller actuators 5, a head-skew actuator may be employed to adjust the position of head 2 so that the head is kept perpendicular to the direction of tape motion. Tensioning bars, rollers, etc. could also be employed for adjusting tape tension rather than adjusting the tape reel motor torque as described above.

The fourth servo reader need not be operative concurrently with the other three, but could be activated only when required. Alternatively, this fourth signal could be employed to generate a second set of estimates, which could be used to improve the quality of the estimates by averaging in servo controller 10. In addition, individual estimates for $\theta$, $\theta'$, $\Delta T$, and $\Delta T'$ may be averaged over a number of successive calculations, or other filtering operations may be employed in servo controller 10 to reduce the standard deviation of the estimates supplied to controllers 11, 12. Such filtering operations can be performed in generally known manner as will be apparent to those skilled in the art.

Embodiments can also be envisioned in which the position values y and the corresponding time measurements (in particular, differences between time instants) are averaged or filtered over several measurements, the resulting values then being used by the servo controller to calculate the skew and tension variation values. In simplified embodiments, the effects of time dependency of $\theta$ and $\Delta T$ may not be taken into account so that only values for $\theta$ and $\Delta T$, and not their time derivatives, are calculated by the servo controller. The necessary modifications to the formulae derived above will be apparent to those skilled in the art for this situation. In such embodiments, any two servo readers S operated concurrently will be sufficient for the necessary calculations. The remaining servo read signals would offer redundancy in the case of failure or could be used to increase accuracy as described above. It will of course be appreciated that many other changes and modifications can be made to the exemplary embodiments described without departing from the scope of the invention.

We claim:

1. Servo apparatus for a tape drive having a read/write head for reading and writing data on magnetic tape having at least one servo track for providing transverse position information, the servo apparatus comprising:
   at least two servo readers associated with the read/write head, each servo reader being arranged for reading said at least one servo track during read/write operations, the servo readers being operative concurrently to generate respective servo read signals;
   a position estimator for processing each servo read signal to generate a series of position values each corresponding to a respective time instant, the position values being indicative of transverse position of the associated servo reader; and
   a servo controller for calculating from said position values and time instants (i) a skew value indicative of tape skew relative to the read/write head and (ii) a tension variation value indicative of variation of tape tension from a reference value;
   wherein said servo controller is adapted to account for cross-coupling between tape skew and tension variation in calculating the skew and tension variation values.

2. Apparatus according to claim 1 wherein the servo readers comprise a pair of servo readers arranged for reading the same servo track.

3. Apparatus according to claim 1 wherein the servo readers comprise a pair of servo readers arranged for reading different servo tracks spaced transversely across the tape.

4. Apparatus according to claim 1 wherein the servo readers comprise at least three servo readers arranged for reading at least two servo tracks and operative concurrently to generate respective servo read signals.

5. Apparatus according to claim 4 wherein the three servo readers comprise: (i) a pair arranged for reading a first servo track and (ii) a third arranged for reading a different servo track spaced transversely across the tape from the first servo track.

6. Apparatus according to claim 5 the servo readers comprise a fourth servo reader arranged for reading said different servo track.

7. Apparatus according to claim 1 further comprising:
   a tension adjustment mechanism for adjusting tape tension in dependence on said tension variation value, and
   a skew adjustment mechanism for adjusting tape skew relative to the read/write head in dependence on said skew value.

8. Apparatus according to claim 4 wherein the servo controller is further adapted to:
   account for time dependency of tape skew and tension variation in calculating the skew and tension variation values; and
   calculate respective time derivatives of the skew and tension variation values.

9. Apparatus according to claim 8 further comprising:
   a tension adjustment mechanism for adjusting tape tension in dependence on said tension variation value and said time derivative thereof; and
   a skew adjustment mechanism for adjusting tape skew in dependence on said skew value and said time derivative thereof.

10. Apparatus according to claim 1 wherein the position estimator is adapted to process TBS servo read signals to generate said position values.

11. A tape drive, comprising:
- a read/write head for reading and writing data on magnetic tape having at least one servo track for providing transverse position information;
- a drive system for effecting movement of the tape relative to the read/write head;
- at least two servo readers associated with the read/write head, each arranged for reading said at least one servo track during read/write operations, the servo readers being operative concurrently to generate respective servo read signals;
- a position estimator for processing each servo read signal to generate a series of position values, corresponding to respective time instants, indicative of transverse position of the associated servo reader;
- a servo controller for calculating from said position values and time instants (i) a skew value, indicative of tape skew relative to the read/write head, and (ii) a tension variation value indicative of variation of tape tension from a reference value, wherein the servo controller is adapted to account for cross-coupling between tape skew and tension variation in calculating the skew and tension variation values;
- a tension adjustment mechanism for adjusting tape tension in dependence on said tension variation value; and
- a skew adjustment mechanism for adjusting tape skew relative to the read/write head in dependence on said skew value.

12. A tape drive as claimed in claim 11, further comprising:
- an additional servo reader to have a total of at least three servo readers that are arranged for reading at least two servo tracks and operative concurrently to generate respective servo read signals, wherein:
- the servo controller is further adapted to account for time dependency of tape skew and tension variation in calculating the skew and tension variation values, and to calculate respective time derivatives of the skew and tension variation values;
- the tension adjustment mechanism is adapted to adjust tape tension in dependence on said tension variation value and said time derivative thereof; and
- the skew adjustment mechanism is adapted to adjust tape skew in dependence on said skew value and said time derivative thereof.

13. A servo control method for a tape drive having a read/write head for reading and writing data on magnetic tape with at least one servo track for providing transverse position information, the method comprising the steps of:
- reading at least one said servo track during read/write operations concurrently with at least two servo readers associated with the read/write head to generate respective servo read signals;
- processing each servo read signal to generate a series of position values, corresponding to respective time instants, indicative of transverse position of the associated servo reader; and
- calculating from said position values and time instants (i) a skew value, indicative of tape skew relative to the read/write head, and (ii) a tension variation value indicative of variation of tape tension from a reference value; and
- accounting in said calculating step for cross-coupling between tape skew and tension variation.

14. A method according to claim 13 further including reading one servo track concurrently with a pair of servo readers.

15. A method according to claim 13 further including reading two servo tracks, spaced transversely across the tape, with respective servo readers.

16. A method according to claim 13 further including reading at least two servo tracks concurrently with at least three servo readers to generate respective servo read signals.

17. A method according to claim 16 further including concurrently reading a first servo track with a pair of servo readers and a different servo track, spaced transversely across the tape from the first servo track, with a third servo reader to generate respective servo read signals.

18. A method according to claim 13 further including adjusting tape tension in dependence on said tension variation value, and adjusting tape skew relative to the read/write head in dependence on said skew value.

19. A method according to claim 16 wherein the calculation of the skew and tension variation values accounts for time dependency of tape skew and tension variation, the method including calculating respective time derivatives of the skew and tension variation values.

20. A method according to claim 19 further including:
- adjusting tape tension in dependence on said tension variation value and said time derivative thereof; and
- adjusting tape skew relative to the read/write head in dependence on said skew value and said time derivative thereof.

* * * * *